(12) United States Patent
Sasaki

(10) Patent No.: US 8,271,020 B2
(45) Date of Patent: Sep. 18, 2012

(54) CELLULAR TELEPHONE AND PERSONAL DIGITAL ASSISTANT

(75) Inventor: Koji Sasaki, Kyoto (JP)

(73) Assignee: J-Data Co., Ltd., Kyoto-shi (JP)

( * ) Notice: Subject to any disclaimer, the term of this patent is extended or adjusted under 35 U.S.C. 154(b) by 0 days.

(21) Appl. No.: 12/353,682

(22) Filed: Jan. 14, 2009

(65) Prior Publication Data

US 2009/0131107 A1 May 21, 2009

Related U.S. Application Data

(63) Continuation of application No. 10/594,336, filed as application No. PCT/JP2005/011923 on Jun. 29, 2005.

(30) Foreign Application Priority Data

Jul. 21, 2004 (JP) ................................ 2004-212862
Mar. 1, 2005 (JP) ................................ 2005-055379

(51) Int. Cl.
*H04M 1/00* (2006.01)

(52) U.S. Cl. ...................... 455/550.1; 455/551; 455/566; 455/556.2

(58) Field of Classification Search .......... 455/564–566, 455/412–414, 550.1, 550.2; 379/368, 433.07, 379/354, 142.17
See application file for complete search history.

(56) References Cited

U.S. PATENT DOCUMENTS

| | | | | |
|---|---|---|---|---|
| 6,961,590 | B1 * | 11/2005 | Toebes | 455/564 |
| 2002/0052196 | A1 | 5/2002 | Padawer et al. | |
| 2002/0198027 | A1 | 12/2002 | Rydbeck | |
| 2003/0060238 | A1 | 3/2003 | McCarthy et al. | |
| 2004/0018852 | A1 | 1/2004 | Burke et al. | |
| 2004/0203954 | A1 * | 10/2004 | Mikan et al. | 455/466 |
| 2004/0248621 | A1 | 12/2004 | Schon | |
| 2005/0208977 | A1 * | 9/2005 | Mori et al. | 455/564 |

(Continued)

FOREIGN PATENT DOCUMENTS

EP 0 570 116 A 11/1993

(Continued)

OTHER PUBLICATIONS

"FOMA P2102V Tori Atsukai Setsumeisho Kihonhen", Nippon, NTT DOCOMO, Edition 3, 2003 Nen 4 Gatsu, pp. 3-161 to 3-162.

(Continued)

*Primary Examiner* — Kathy Wang-Hurst
(74) *Attorney, Agent, or Firm* — Oblon, Spivak, McClelland, Maier & Neustadt, L.L.P.

(57) ABSTRACT

A user enters a numeric string on a standby screen of a cellular telephone (1), and then presses a predetermined function key, the numeric string being obtained by numerical conversion of a keyword related to a piece of registration information, e.g. a destination e-mail address, in accordance with an assignment relationship between characters and numerical keys. In the cellular telephone having recognized the entry of the numeric string and the pressing of the predetermined function key, a database is searched by using as a key the entered numeric string or a character string obtained by character conversion of the entered numeric string in accordance with the above-mentioned assignment relationship, and e-mail destination candidates associated with the numeric string or the character string are extracted and displayed on a display. The user selects a desired destination from among the candidates, whereby an e-mail destination address is selected and called up.

12 Claims, 9 Drawing Sheets

U.S. PATENT DOCUMENTS

2007/0161409 A1    7/2007   Ohtsuki et al.

FOREIGN PATENT DOCUMENTS

| | | |
|---|---|---|
| EP | 1 193 956 A2 | 4/2002 |
| EP | 1 259 050 A1 | 11/2002 |
| FR | 2 807 535 | 10/2001 |
| GB | 2 369 750 A | 6/2002 |
| JP | 9-330195 | 12/1997 |
| JP | 2000-125011 | 4/2000 |
| JP | 2001-257711 | 9/2001 |
| JP | 2002-183252 | 6/2002 |
| JP | 2003-167822 | 6/2003 |
| JP | 2004-86445 | 3/2004 |
| WO | WO 98/33111 A | 7/1998 |
| WO | WO 03/001778 A | 1/2003 |
| WO | WO 03/060772 A1 | 7/2003 |

OTHER PUBLICATIONS

Japanese Office Action issued Oct. 11, 2011, in Patent Application No. 2005-55379.

* cited by examiner

F I G . 5

| NUMERICAL KEY | CORRESPONDING CHARACTER(S) |
|---|---|
| 1 | 1 |
| 2 | 2<br>A、B、C |
| 3 | 3<br>D、E、F |
| 4 | 4<br>G、H、I |
| 5 | 5<br>J、K、L |
| 6 | 6<br>M、N、O |
| 7 | 7<br>P、Q、R、S |
| 8 | 8<br>T、U、V |
| 9 | 9<br>W、X、Y、Z |
| 0 | 0<br>_ |

F I G . 6

| FULL NAME | NUMERIC DATA | E-MAIL ADDRESS |
|---|---|---|
| . . . | . . . | . . . |
| Taro Yamada | 8276926232 | yamataro@abc.co.jp |
| Kin Suzuki | 546789854 | suzukin@abc.co.jp |
| Jin Kato | 5465286 | katojin@abc.co.jp |
| . . . | . . . | . . . |
| . . . | . . . | . . . |

45

F I G . 8
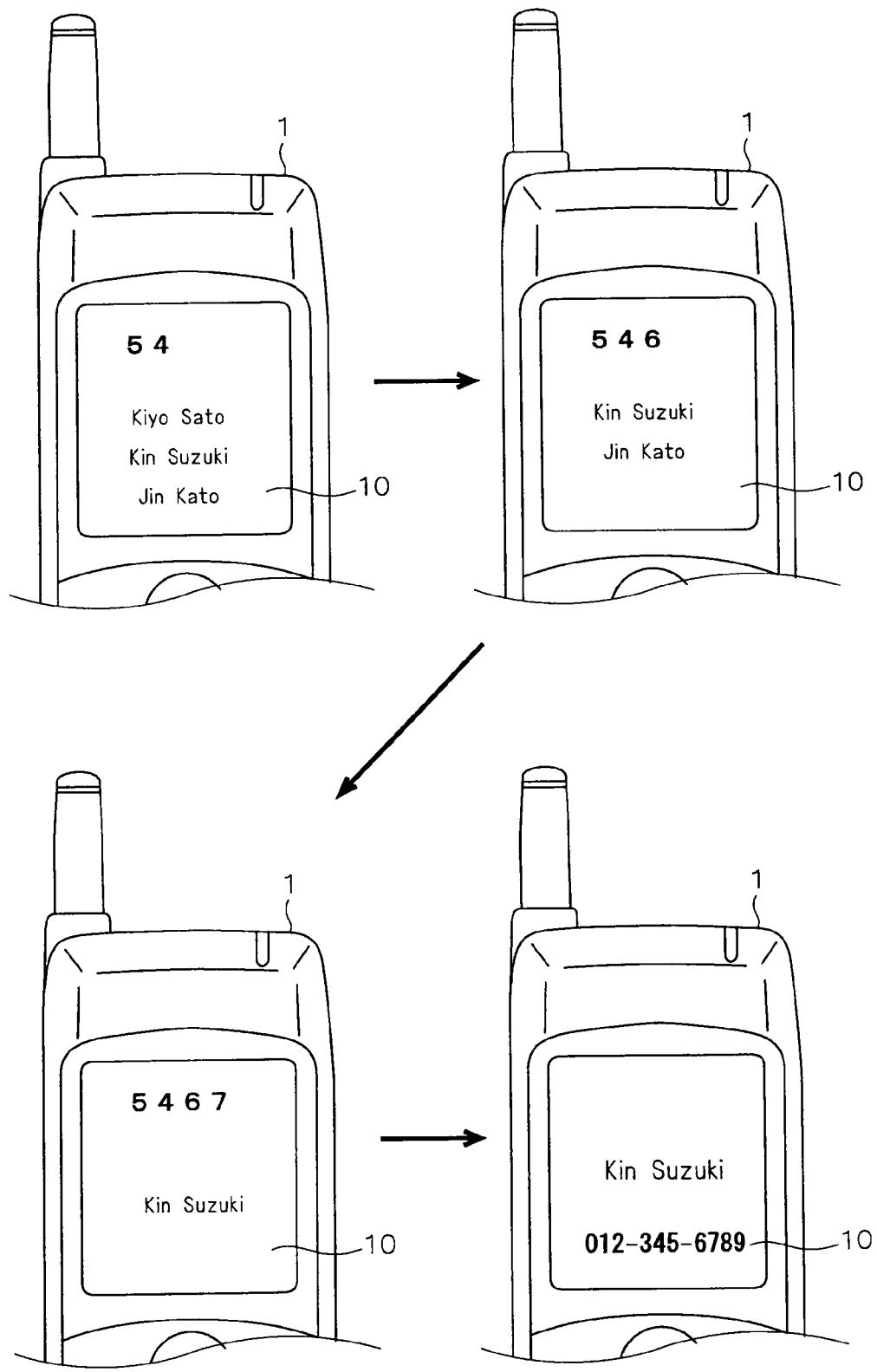

CELLULAR TELEPHONE AND PERSONAL DIGITAL ASSISTANT

CROSS-REFERENCE TO RELATED APPLICATIONS

The present application is a continuation of U.S. application Ser. No. 10/594,336 filed on Sep. 27, 2006, and claims priority to JP 2004-212862 filed on Jul. 21, 2004 and JP 2005-055379 filed on Mar. 1, 2005, the entire contents of each of which are hereby incorporated herein by reference.

TECHNICAL FIELD

The present invention is an invention relating to a personal digital assistant which stores therein registration information including e-mail addresses, telephone numbers and the like and which allows the registration information to be called up and used as appropriate and, more particularly, to a cellular telephone.

BACKGROUND ART

As is well known in the art, cellular telephones which have exhibited a rapid proliferation in recent years have not only a function merely as mobile or portable telephones but also a function as mobile terminal devices. Specifically, it is possible to connect to the Internet through a cellular telephone, and there is a widespread proliferation of sending and receiving pieces of e-mail by using a cellular telephone (See Patent Document 1 as an example). Cellular telephones themselves become more sophisticated in functionality, and various settings of cellular telephones can be made to suit the preferences of users.

For sending a piece of e-mail, for example, from a cellular telephone, it is conventionally common practice to select a desired e-mail address from among a multiplicity of e-mail addresses registered in an address book, thereby determining the selected e-mail address as a destination to which the piece of e-mail is to be sent. To specify the destination of a piece of e-mail, such a process has been widely adopted that a user performs a predetermined manipulation by using dial keys to open an address book, and selects the destination from a list thereof via the dial keys. For function settings of the cellular telephone, such a process has been prevailing that the user performs a predetermined manipulation by using the dial keys to follow a menu screen, selects a necessary item from a menu, and performs a setting manipulation.

Patent Document 1: Japanese Patent Application Laid-Open No. 2001-257711

In this manner, the manipulations of calling up registration information (registered mail addresses and functions) to make a selection are very often performed on the cellular telephone. However, the number of dial keys that can be arranged on the cellular telephone is limited to approximately twenty at most because of size limitations, and the user manipulates the approximately twenty keys to make a selection from among various pieces of registration information and to set the various pieces of registration information. Thus, the operability of cellular telephones is much inferior than that of personal computers and the like each having a keyboard and a mouse, and there has been a problem such that the more sophisticated the functionality of cellular telephones becomes, the more cumbersome the operability for calling up the registration information inevitably becomes.

DISCLOSURE OF INVENTION

The present invention is intended for a cellular telephone allowing registration information to be called up and used.

According to the present invention, there is an assignment relationship established between each numerical key included among dial keys of the cellular telephone, and a numerical character on each numerical key and/or a plurality of single alphabetical characters. The cellular telephone comprises: a storage means for storing a database in which numeric data and a piece of registration information are associated with each other, the numeric data being obtained by numerical conversion of a keyword related to the piece of registration information in accordance with the assignment relationship; an acceptance means for accepting a numeric string entered by using the dial keys as a call request for a predetermined piece of registration information; an extraction means for searching the database to extract a piece of registration information associated with numeric data containing the numeric string; and a display means for displaying the piece of registration information extracted by the extraction means.

A user can easily call up a desired piece of registration information only by entering a relatively short numeric string obtained by the numerical conversion of the keyword related to the desired piece of registration information in accordance with the assignment relationship.

According to another aspect of the present invention, there is an assignment relationship established between each numerical key included among dial keys of the cellular telephone, and a numerical character on each numerical key and/or a plurality of single alphabetical characters. The cellular telephone comprises: a storage means for storing a database in which a keyword related to a piece of registration information and the piece of registration information are associated with each other; an acceptance means for accepting a numeric string entered by using the dial keys as a call request for a predetermined piece of registration information; an extraction means for searching the database to extract a piece of registration information associated with a keyword containing a character string obtained by character conversion of the numeric string in accordance with the assignment relationship; and a display means for displaying the piece of registration information extracted by the extraction means.

A user can easily call up a desired piece of registration information only by entering a relatively short numeric string obtained by the numerical conversion of the keyword related to the desired piece of registration information in accordance with the assignment relationship.

The present invention is also intended for a personal digital assistant including numerical keys, the personal digital assistant allowing registration information to be called up and used.

It is therefore an object of the present invention to provide a cellular telephone and a personal digital assistant which allow registration information to be easily called up.

BRIEF DESCRIPTION OF DRAWINGS

FIG. 5 is a chart showing an assignment relationship between numerical keys and characters;

FIG. 6 is a chart showing an example of a database;

FIG. 8 is a view showing display transitions on the display of the cellular telephone in response to the progress of a processing procedure according to a third preferred embodiment.

BEST MODE FOR CARRYING OUT THE INVENTION

Preferred embodiments according to the present invention will now be described in detail with reference to the drawings.

1. First Preferred Embodiment

Figure 1:
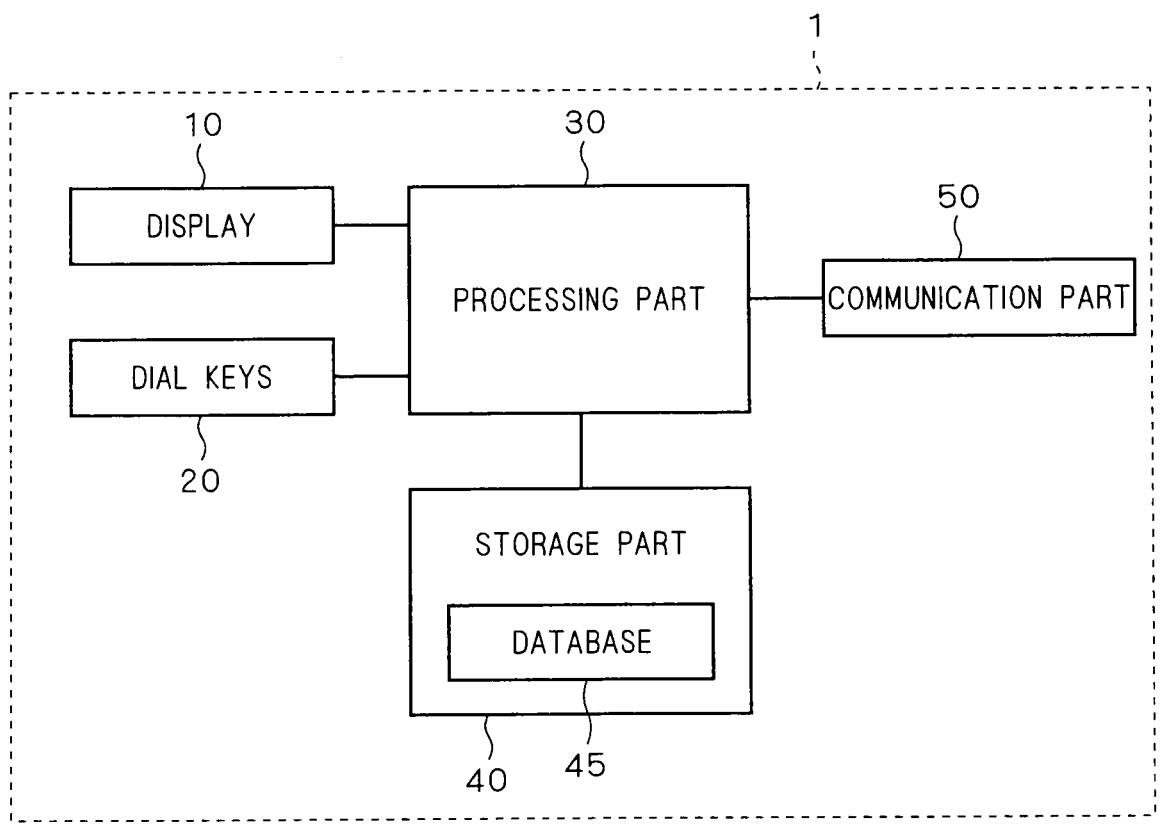
FIG. 1 is a block diagram showing a construction of a cellular telephone according to the present invention.

FIG. 1 is a block diagram showing a functional construction of a cellular telephone according to the present invention. The cellular telephone 1 includes a display 10, dial keys 20, a processing part 30, a storage part 40 and a communication part 50. The display 10 is a liquid crystal display, and displays various pieces of information and content. The dial keys 20 are input keys for a user to perform a manipulation on the cellular telephone 1. The dial keys 20 include numerical keys and function keys. The processing part 30 is constructed using a CPU for performing a computation process, and executes various processes in accordance with a predetermined program.

The storage part 40 is constructed using a memory for storing data therein. A database 45 to be described later is stored in this storage part 40. The communication part 50 is constructed using a telecommunication circuit, and establishes communication with a base station. The display 10, the dial keys 20, the processing part 30 and the storage part 40 perform predetermined operations under the control of the processing part 30. The cellular telephone 1 is further provided with an antenna, a microphone, a speaker, a battery, a CCD and the like in addition to the above.

Figure 2:
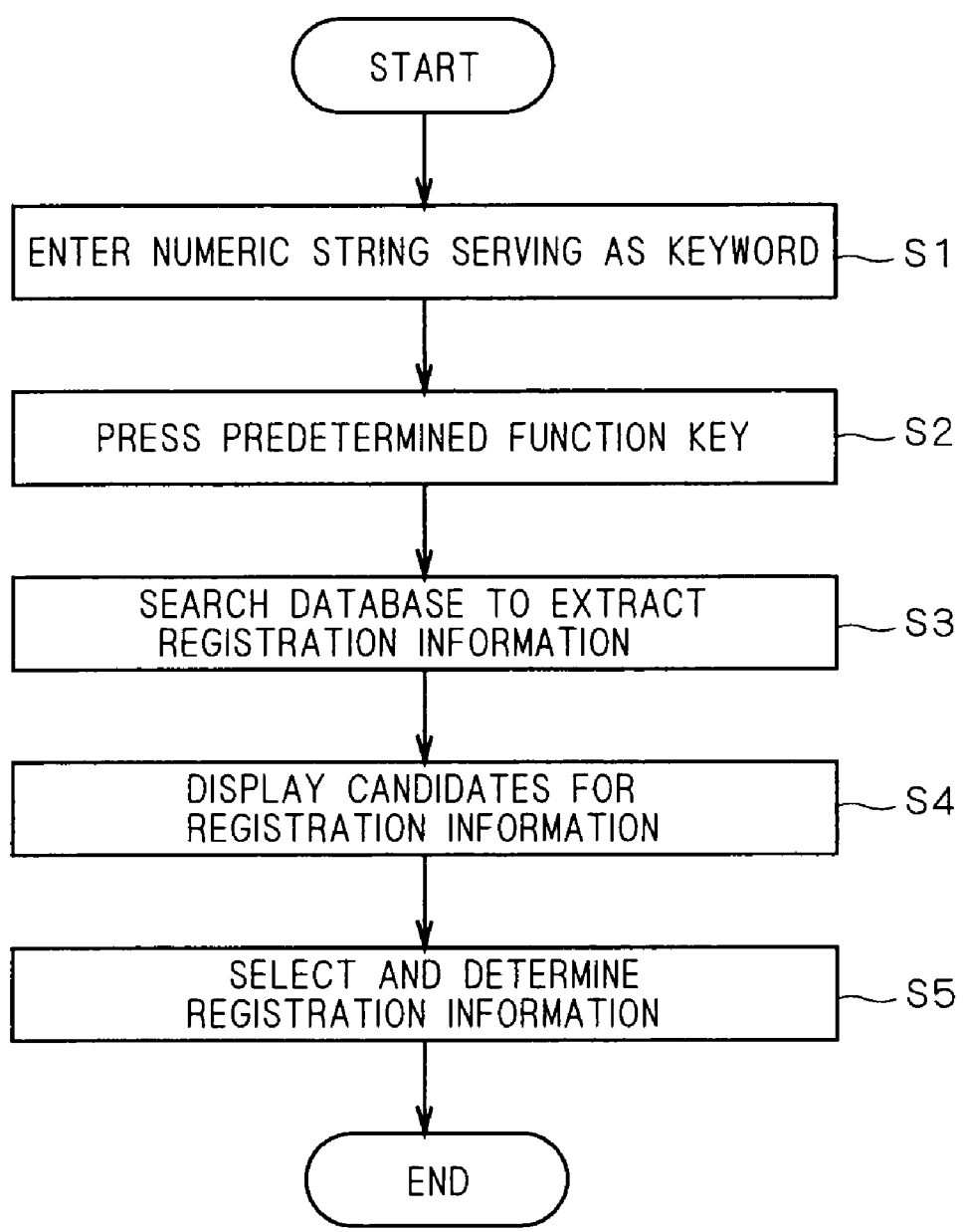
FIG. 2 is a flow chart showing an operational procedure in the cellular telephone of FIG. 1.
Figure 3:
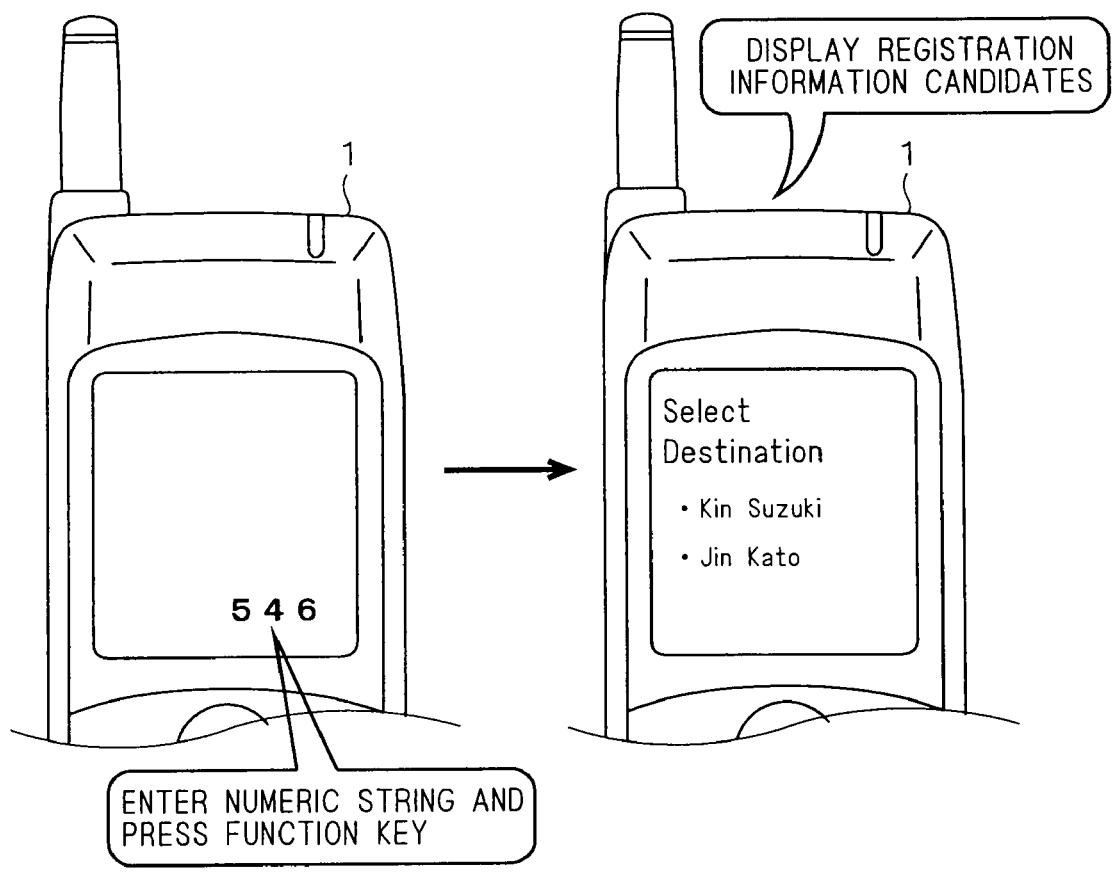
FIG. 3 is a view showing display transitions on a display of the cellular telephone in response to the progress of the processing procedure of FIG. 2.

FIG. 2 is a flow chart showing an operational procedure in the cellular telephone 1. FIG. 3 is a view showing display transitions on the display 10 of the cellular telephone 1 in response to the progress of the processing procedure of FIG. 2. A procedure for calling up an e-mail address of a destination when a user sends a piece of e-mail by using the cellular telephone 1 is taken herein as an example for description.

First, the user enters a numeric string by using the dial keys 20 of the cellular telephone 1 (in Step S1), the numeric string being obtained by numerical conversion of a keyword related to a piece of registration information (in this example, a destination e-mail address). In this preferred embodiment, the user directly enters the numeric string on a standby screen of the cellular telephone 1. The numeric string obtained by the numerical conversion of the keyword of the destination e-mail address is that obtained by the numerical conversion of the keyword of the destination address under the following rules.

Figure 4:
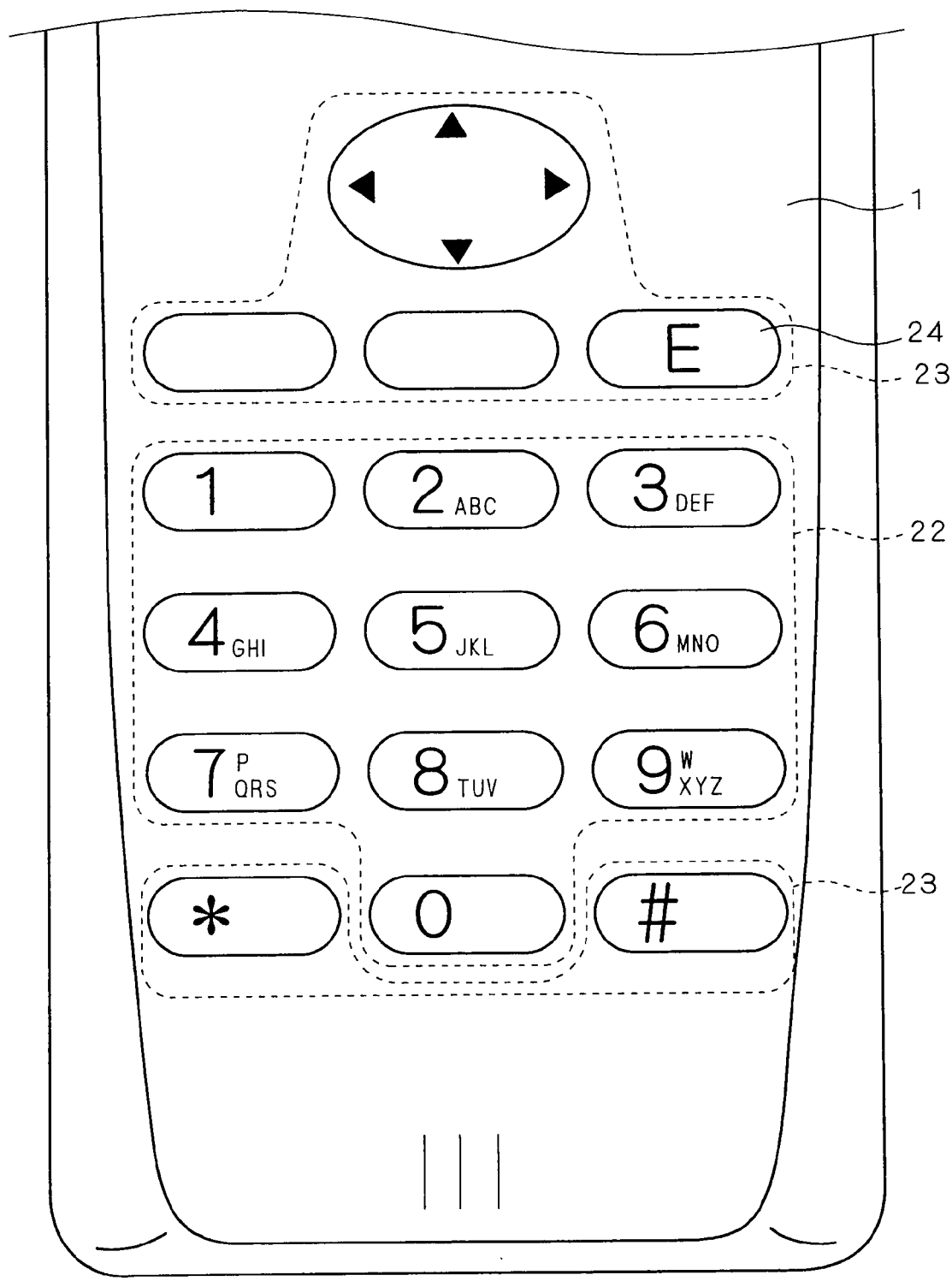
FIG. 4 is a view illustrating a typical arrangement of dial keys of the cellular telephone.

Specifically, the dial keys 20 for most cellular telephones include numerical keys (a so-called ten-digit keypad) and function keys (for example, a "*" key and a "#" key). FIG. 4 is a view illustrating a typical arrangement of the dial keys of the cellular telephone 1. The dial keys 20 of the cellular telephone 1 in this preferred embodiment include ten numerical keys 22, and function keys 23 including the "*" key, the "#" key and an E-mail key 24. Of these keys, each of the numerical keys 22 is labeled with not only a corresponding numerical character but also alphabetical characters. This is intended to allow the entry of letters in the cellular telephone 1 on which only a limited number of keys can be arranged, as is well known. To enter the letter "K" as an example, the user usually places the cellular telephone 1 into a letter entry mode and presses the "5" key twice.

In this preferred embodiment, an assignment relationship as shown in FIG. 5 is established between each of the ten numerical keys 22, and a numerical character of a corresponding numerical key and/or a plurality of single alphabetical characters. Specifically, a numerical character and single alphabetical characters on each numerical key are assigned to each of the ten numerical keys 22. Of the numerical keys 22, the "7" key as an example is labelled with the numerical character "7" and the alphabetical characters "PQRS." The numerical character "7" and the alphabetical characters "P, Q, R, S" are assigned to the "7" key. Of the numerical keys 22, the "1" key is labeled with only the numerical character "1." Only the numerical character "1" is assigned to the "1" key. A hyphen (-) as well as the numerical character "0" is assigned to the "0" key.

The user enters a numeric string on the standby screen of the cellular telephone 1 by using the dial keys 20, the numeric string being obtained by the numerical conversion of a keyword of a desired destination e-mail address in accordance with the above-mentioned assignment relationship shown in FIG. 5. For example, a user who desires to send a piece of e-mail to "Taro Yamada" enters "8276" which is obtained by the numerical conversion of the keyword "Taro" in accordance with the above-mentioned assignment relationship. A user who desires to send a piece of e-mail to "Kin Siziki" enters "546" which is obtained by the numerical conversion of the keyword "Kin." It should be noted that a numeric string obtained by the numerical conversion of a full name as a keyword in accordance with the above-mentioned assignment relationship, e.g. "8276926232" obtained by the numerical conversion of "Taro Yamada," may be adapted to be entered.

Next, the procedure proceeds to Step S2 in which the user who has directly entered the numeric string on the standby screen of the cellular telephone 1 presses a predetermined function key, e.g. the E-mail key 24 (See FIG. 4). When a numeric string is entered on the standby screen and the E-mail key 24 is pressed, the processing part 30 judges that this indicates a call request for an e-mail address using the numeric string as a search key. Then, the processing part 30 searches the database 45 held in the storage part 40 by using the numeric string as a search key to retrieve or extract a piece of registration information (in this case, an e-mail address) associated with numeric data containing the numeric string (in Step S3). The numeric data in this preferred embodiment is that obtained by the numerical conversion of the keyword related to the destination e-mail address in accordance with the assignment relationship of FIG. 5. Specifically, numeric data obtained by the numerical conversion of the full name of each destination to which a piece of e-mail is to be sent in accordance with the assignment relationship of FIG. 5 is stored in association with an e-mail address of each destination in the database 45 held in the storage part 40.

FIG. 6 is a chart showing an example of the database 45. The database 45 serves as a so-called address book database. In the database 45 shown in FIG. 6, a full name and numeric data for each destination are associated with an e-mail address. The numeric data used herein is that obtained by the numerical conversion of the full name as the keyword related to registration information in accordance with the assignment relationship of FIG. 5. For example, the full name "Taro Yamada," the numeric data "8276926232" obtained by the numerical conversion thereof in accordance with the assignment relationship of FIG. 5, and "yamataro@abc.co.jp" which is an e-mail address of "Taro Yamada" are associated with each other for "Taro Yamada" which is one of the destinations. The full name "Kin Suzuki," the numeric data "546789854" obtained by the numerical conversion thereof in accordance with the assignment relationship of FIG. 5, and "suzukin@abc.co.jp" which is an e-mail address of "Kin Suzuki" are associated with each other for "Kin Suzuki" which is another destination.

The database 45 is created in such a manner that when the user registers a new e-mail address, the processing part 30 automatically creates the numeric data from a full name in accordance with the above-mentioned assignment relationship, and registers the full name, the numeric data and the e-mail address in association with each other in the database 45. That is, when accepting a new piece of registration information (in this example, an e-mail address), the processing part 30 registers the numeric data obtained by the numerical conversion of the keyword (in this example, a full name) related to the piece of registration information in accordance with the assignment relationship of FIG. 5, and the piece of registration information in association with each other in the database 45.

When a numeric string is entered on the standby screen and the E-mail key 24 is pressed, the processing part 30 searches the database 45 as shown in FIG. 6 to retrieve or extract an e-mail address associated with the numeric data containing the numeric string. For example, when the user inputs "Kin" as a keyword, that is, enters the numeric string "546" on the standby screen and then presses the E-mail key 24, the processing part 30 searches a numeric data field of the database 45 to retrieve or extract an e-mail address associated with the numeric data containing "546." In this case, the e-mail addresses of "Kin Suzuki" and "Jin Kato" associated with the numeric data containing "546" are extracted in the instance of FIG. 6. These e-mail addresses are candidates for a destination desired by the user.

In searching the database 45 for numeric data containing a predetermined numeric string, partial match retrieval is performed in this preferred embodiment, but exact match retrieval may be performed. For the exact match retrieval, when the user enters the numeric string "546789854" on the standby screen and presses the E-mail key 24, only the e-mail address of "Kin Suzuki" associated with the numeric data exactly matching the numeric string is extracted. Whether to perform the partial match retrieval or the exact match retrieval may be determined previously as a search operation detail in the processing part 30 or be made suitably changeable by settings.

After the completion of the extraction of the piece of registration information using the numeric string as the search key, the procedure proceeds to Step S4 in which the processing part 30 displays the extracted piece of registration information on the display 10. For example, when the user enters "546" on the standby screen and presses the E-mail key 24 as described above, the e-mail addresses of "Kin Suzuki" and "Jin Kato" are extracted, and the full names or the e-mail addresses thereof are displayed as candidates for the e-mail destination on the display 10 (See FIG. 3). Subsequently, the procedure proceeds to Step S5 in which the user who has viewed the displayed candidates for the destination selects a desired piece of registration information to determine the selection as the destination. As a result, the e-mail address of the destination is selected and called up.

In the above-mentioned manner, the user can retrieve a desired destination from the address book only by entering a numeric string obtained by the numerical conversion of a keyword related to a destination address in accordance with the assignment relationship of FIG. 5 on the standby screen of the cellular telephone 1 and then pressing the E-mail key 24, and can specify the destination of a piece of e-mail easily by selecting a destination address from among the candidates for the destination.

Conventionally, when a user sends a piece of e-mail, it has been a common practice to open the address book once by performing a predetermined manipulation and to make a selection from among a plurality of e-mail addresses registered therein. However, in a manner as described in this preferred embodiment, the user can enter a numeric string readily as if the user entered a telephone number to easily retrieve the destination. Additionally, the assignment relationship as shown in FIG. 5 already conforms to the kana characters and alphabetical characters on the numerical keys of typical cellular telephones, so that the user can enter a numeric string obtained by the numerical conversion of a keyword without feeling much uncomfortable.

2. Second Preferred Embodiment

Next, a second preferred embodiment according to the present invention will be described. In the first preferred embodiment, the numeric data obtained by the numerical conversion of the keyword related to each piece of registration information in accordance with the assignment relationship of FIG. 5 is previously registered in the database 45, and the database 45 is searched using the numeric string entered on the standby screen as the direct search key whereby the candidates for the destination are extracted. The second preferred embodiment is adapted to search a typical address book database by using as a search key a character string inferred from a numeric string entered on the standby screen to extract destination candidates.

Figure 7:
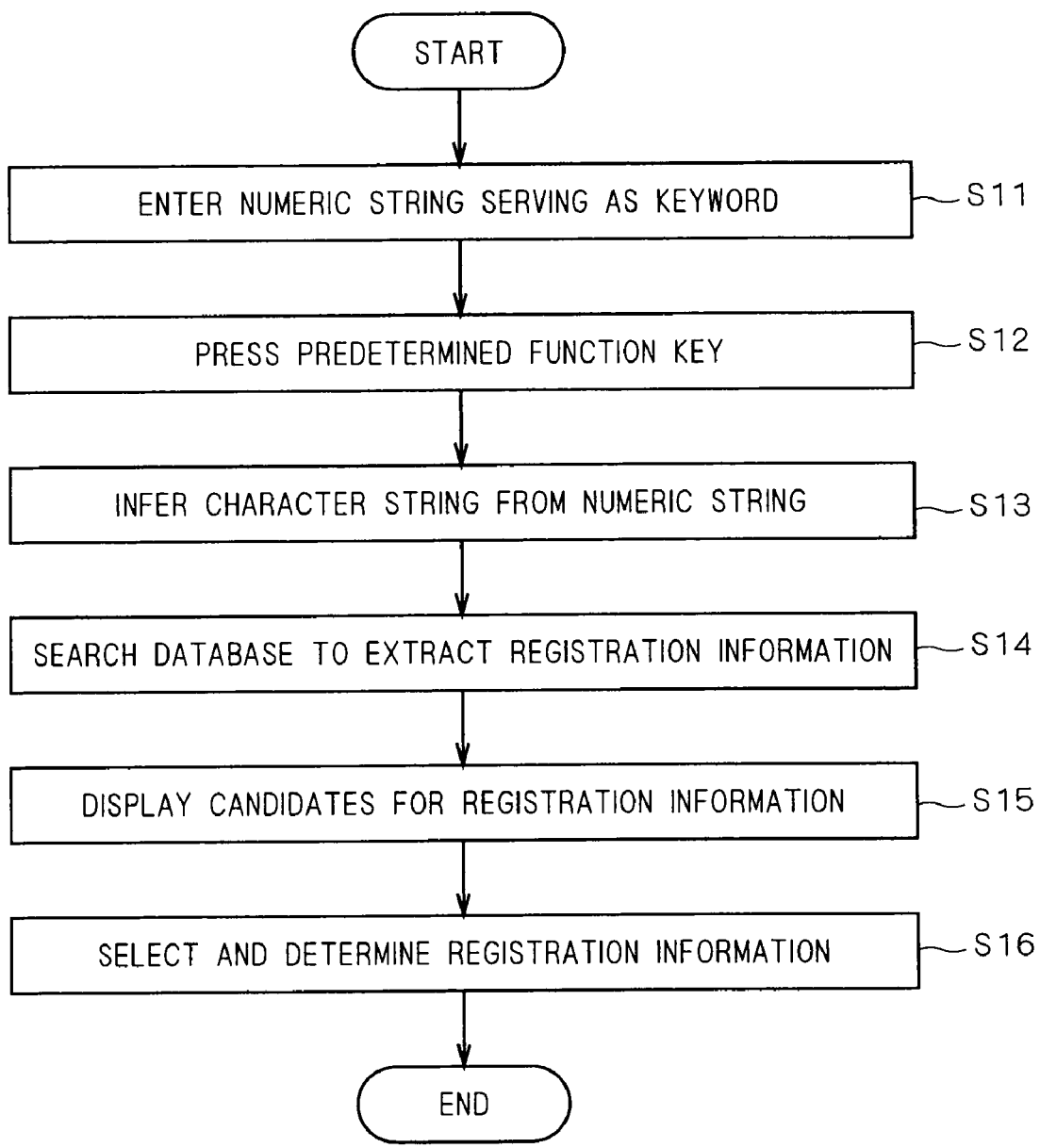
FIG. 7 is a flow chart showing an operational procedure according to a second preferred embodiment.

FIG. 7 is a flow chart showing an operational procedure according to the second preferred embodiment. As in the first preferred embodiment, the user enters a numeric string obtained by the numerical conversion of a keyword of a destination e-mail address by using the dial keys 20 of the cellular telephone 1 (in Step S11), and presses a predetermined function key, e.g. the E-mail key 24 (in Step S12). At this time, the user enters the numeric string obtained by the numerical conversion of the keyword of a desired destination e-mail address in accordance with the assignment relationship of FIG. 5 on the standby screen of the cellular telephone 1.

When a numeric string is entered on the standby screen and the E-mail key 24 is pressed, the processing part 30 judges that this indicates a call request for an e-mail address using the numeric string as a search key. Then, the processing part 30 infers a character string obtained by the character conversion of the numeric string in accordance with the assignment relationship of FIG. 5 (in Step S13). The processing part 30 includes an inference engine for converting a numeric string into a character string in accordance with the assignment relationship of FIG. 5, and a dictionary for extraction of words which are candidates for conversion.

It is apparent from FIG. 5 that a plurality of characters are assigned to a single numeric. Thus, the conversion from a character string to a numeric string in accordance with the assignment relationship of FIG. 5 is uniquely determined, but there can be a plurality of candidates when a numeric string is converted to a character string. For example, the conversion of the character string "Kin" to a numeric string in accordance with the assignment relationship of FIG. 5 provides "546" uniquely, but the conversion of the numeric string "546" to a character string in accordance with the assignment relationship can provide a plurality of candidates such as "Kin," "Jin" and the like. Such candidates for conversion are previously stored in the dictionary of the processing part 30. When a numeric string is entered on the standby screen and the E-mail key 24 is pressed, the processing part 30 makes an inference by converting the numeric string into characters in accordance with the assignment relationship of FIG. 5 and then extracting a character string stored in the dictionary from among the characters. At this time, there is a possibility that a plurality of character strings are extracted. In general, the smaller the number of characters included in the numeric string, the higher the possibility that the number of character string candidates increases.

Subsequently, the processing part 30 searches the database 45 held in the storage part 40 by using the above-mentioned inferred character string as a search key to retrieve or extract a piece of registration information (in this case, an e-mail address) associated with a keyword containing the character string (in Step S14). The database 45 according to the second preferred embodiment is required only to include at least a keyword related to each piece of registration information in association with each piece of registration information. The database 45 according to the second preferred embodiment may be similar to that shown in FIG. 6 as in the first preferred embodiment, or may be similar to a conventional typical address book database.

When the user inputs "kin" as a keyword, that is, enters the numeric string "546" on the standby screen and presses the E-mail key 24, the processing part 30 infers the character string "Kin" from the numeric string "546," and searches a full name field of the database 45 to retrieve or extract an e-mail address associated with the keyword containing "Kin." At this time, whether to count the information exactly matching the character string or the information partially matching the character string as a hit may be previously determined as a search operation detail in the processing part 30 or be made suitably changeable by settings. Because the character string "Jin" can be inferred from the numeric string "546," an e-mail address associated with a keyword containing "Jin" is retrieved or extracted at the same time. As a result, the e-mail addresses of "Kin Suzuki" and "Jin Kato" are extracted, as in the first preferred embodiment.

The subsequent processing is nearly identical with that of the first preferred embodiment. After the completion of the registration information extraction using the character string as the search key, the procedure proceeds to Step S15 in which the processing part 30 displays the extracted pieces of registration information on the display 10. Subsequently, the procedure proceeds to Step S16 in which the user who has viewed the displayed candidates for the destination selects a desired piece of registration information to determine the selection as the destination. As a result, the e-mail address of the destination is selected and called up.

Also in the above-mentioned manner similar to that of the first preferred embodiment, the user can retrieve a desired destination from the address book only by entering a numeric string obtained by the numerical conversion of a keyword related to a destination address in accordance with the assignment relationship of FIG. 5 on the standby screen of the cellular telephone 1 and then pressing the E-mail key 24, and can specify the destination of a piece of e-mail easily by selecting a destination address from among the candidates for the destination.

Third Preferred Embodiment

Next, a third preferred embodiment according to the present invention will be described. In the first and second preferred embodiments, the user presses the predetermined function key after the user enters a full numerical string obtained by the numerical conversion of a keyword. The third preferred embodiment is adapted to narrow down the candidates for a keyword each time the user enters a single numeric of the numeric string obtained by the numerical conversion of the keyword, so that the user presses a predetermined function key when the user confirms the keyword.

FIG. 8 is a view showing display transitions on the display 10 of the cellular telephone 1 in response to the progress of a processing procedure according to the third preferred embodiment. As in the first and second preferred embodiments, the user enters a string of numerics in order by using the dial keys 20 of the cellular telephone 1, the string of numerics being obtained by the numerical conversion of a keyword of a destination telephone number. At this time, the user enters the string of numerics in order which is obtained by the numerical conversion of the keyword of a desired destination telephone number in accordance with the assignment relationship shown in FIG. 5 on the standby screen of the cellular telephone 1. For example, a user who desires to call "Kin Suzuki" enters the string of numerics "546789854" in order which is obtained by the numerical conversion of the keyword "Kin Suzuki" related to the telephone number thereof in accordance with the assignment relationship of FIG. 5.

Then, the processing part 30 narrows down the keyword candidates based on a string of previously entered numerics (i.e. part of the full numeric string which the user is intended to enter on the standby screen) each time the user enters a single numeric on the standby screen, to display the keyword candidates on the display 10. Specifically, the processing part 30 makes a prefix search of the numeric data field of the database 45 by using the part of the full numeric string as a search key to extract and display keywords containing a character string obtained by the character conversion of the part of the full numeric string in accordance with the assignment relationship shown in FIG. 5. Alternatively, the processing part 30 may make a prefix search of the database by using as a search key a character string inferred from the part of the full numeric string to extract and display keywords, as in the second preferred embodiment. It should be noted that the third preferred embodiment takes as an example a telephone number called up as a piece of registration information, in which case telephone numbers are registered in place of or in addition to the e-mail addresses in the database 45 of FIG. 6.

In this manner, when the user enters the string of numerics "546789854" in order which is obtained by the numerical conversion of "Kin Suzuki" in accordance with the assignment relationship of FIG. 5, the keywords "Kiyo Sato," "Kin Suzuki," "Jin Kato" and the like containing character strings obtained by the character conversion of "54" in accordance with the above-mentioned assignment relationship are extracted as keyword candidates and displayed on the display 10, with part of the string of numerics "54" entered, as shown in FIG. 8. With part of the above-mentioned string of numerics "546" entered by the user who adds one numeric, the keywords "Kin Suzuki" and "Jin Kato" containing character strings obtained by the character conversion of "546" in accordance with the above-mentioned assignment relationship are extracted as keyword candidates and displayed on the display 10.

The user further proceeds with the numeric entry. With part of the above-mentioned string of numerics "5467" entered, only the keyword "Kin Suzuki" containing a character string obtained by the character conversion of "5467" in accordance with the above-mentioned assignment relationship is extracted as a keyword candidate and displayed on the display 10. In other words, as the user proceeds with the numeric entry of the numeric string, "Kiyo Sato," "Jin Kato" and the like are no longer the keyword candidates, and the keyword candidates are finally narrowed down to the single keyword.

When the user presses a predetermined function key, e.g. a talk key, after the candidates are narrowed down to the single keyword, the processing part 30 originates a call to a telephone number associated with the keyword. Thus, the user can make an outgoing call to a desired telephone number.

In the above-mentioned manner, the user need not enter the full numeric string obtained by the numeric conversion of a keyword related to a telephone number, but the keywords are narrowed down in the course of the entry thereof, whereby further improvements in convenience is achieved. Because numerous keyword candidates are extracted after the entry of the first single numeric of a numeric string, the processing of the third preferred embodiment is preferably carried out after two or more numerics are entered. Further, it is not always necessary to continue the entry of the numeric string until the keyword candidates are narrowed down to the single keyword. When the keyword candidates are narrowed down to a certain number of keyword candidates, the user may be allowed to make a selection from among the certain number of keyword candidates.

4. Modifications

While the preferred embodiments according to the present invention are described hereinabove, the present invention is not limited to the above-mentioned specific embodiments. In the above-mentioned preferred embodiments, for example, the user directly enters the numeric string obtained by the numerical conversion of the keyword related to the destination address in accordance with the assignment relationship of FIG. 5 on the standby screen of the cellular telephone 1. However, after an e-mail creation screen is opened, the user may enter the numeric string obtained by the numerical conversion of the keyword related to the destination address in accordance with the above-mentioned assignment relationship in a destination specification field of the e-mail creation screen, and then press a predetermined function key. The details of processing executed by the processing part 30 at this time are identical with those of the above-mentioned preferred embodiments.

The assignment relationship between the numerical keys and the characters is not necessarily limited to the corresponding relationship shown in FIG. 5, but may be arbitrarily established. In consideration for the convenience for the user, it is however preferred to adopt the assignment relationship of FIG. 5 conforming to the alphabetical characters already on the numerical keys of typical cellular telephones.

In the above-mentioned second preferred embodiment, the character string candidates inferred by the processing part 30 may be displayed once on the display 10, and the user who has viewed the candidates may select a suitable keyword from among the candidates. Then, the processing part 30 may search the database 45 using the selected keyword as the search key. In this manner, the e-mail addresses extracted by the processing part 30 are narrowed to only an e-mail address desired by the user.

The registration information is a destination e-mail address in the above-mentioned first and second preferred embodiments, but is not limited thereto. Various variations to be described below may be produced as the registration information. First, the registration information may be a telephone number registered in the cellular telephone 1, as in the third preferred embodiment. In this case, when the user enters a numeric string obtained by the numerical conversion of a keyword (e.g., full name) related to the telephone number in accordance with the assignment relationship of FIG. 5 and presses a predetermined function key (e.g., an address book key), the processing part 30 performs a search process similar to that of the above-mentioned preferred embodiments to retrieve or extract the telephone numbers of connection destination candidates, and then displays the telephone numbers on the display 10. In contrast to this, a destination e-mail address may, of course, be used as the registration information in the third preferred embodiment.

Further, the registration information may be a telephone number serving as a destination of short message service (SMS) and registered in the cellular telephone 1. As is well known, the telephone number is typically used as the destination of the short message service. Thus, when the user enters a numeric string obtained by the numerical conversion of a keyword (e.g., full name) related to a destination telephone number of the short message service in accordance with the assignment relationship of FIG. 5 and presses a predetermined function key, the processing part 30 performs a search process similar to that of the above-mentioned preferred embodiments to retrieve or extract the destination telephone numbers of destination candidates, and then displays the destination telephone numbers on the display 10.

Further, the registration information may be various functions registered in the cellular telephone 1. Such functions include, for example, date setting, standby screen setting, ringtone setting, answerphone setting, silent mode setting, and other etceteras. When the user enters a numeric string obtained by the numerical conversion of a keyword (e.g., answerphone) related to the above-mentioned functions in accordance with the assignment relationship of FIG. 5 and presses a predetermined function key (e.g., a menu key), the processing part 30 performs a search process similar to that of the above-mentioned preferred embodiments to retrieve or extract the function candidates, and then displays the function candidates on the display 10. The user selects a desired one of the displayed functions, whereby the selected function is executed in the cellular telephone 1.

Further, the registration information may be the address (URL) of a favorite site registered in the cellular telephone 1. In this case, when the user enters a numeric string obtained by the numerical conversion of a keyword related to a favorite site in accordance with the assignment relationship of FIG. 5 and presses a predetermined function key (e.g. Internet connection key), the processing part 30 performs a search process similar to that of the above-mentioned preferred embodiments to retrieve or extract bookmarked connection destination site candidates, and then displays the candidates on the display 10. The user selects a desired site from among the displayed candidates, whereby the cellular telephone 1 is connected to the selected site.

Figure 9:
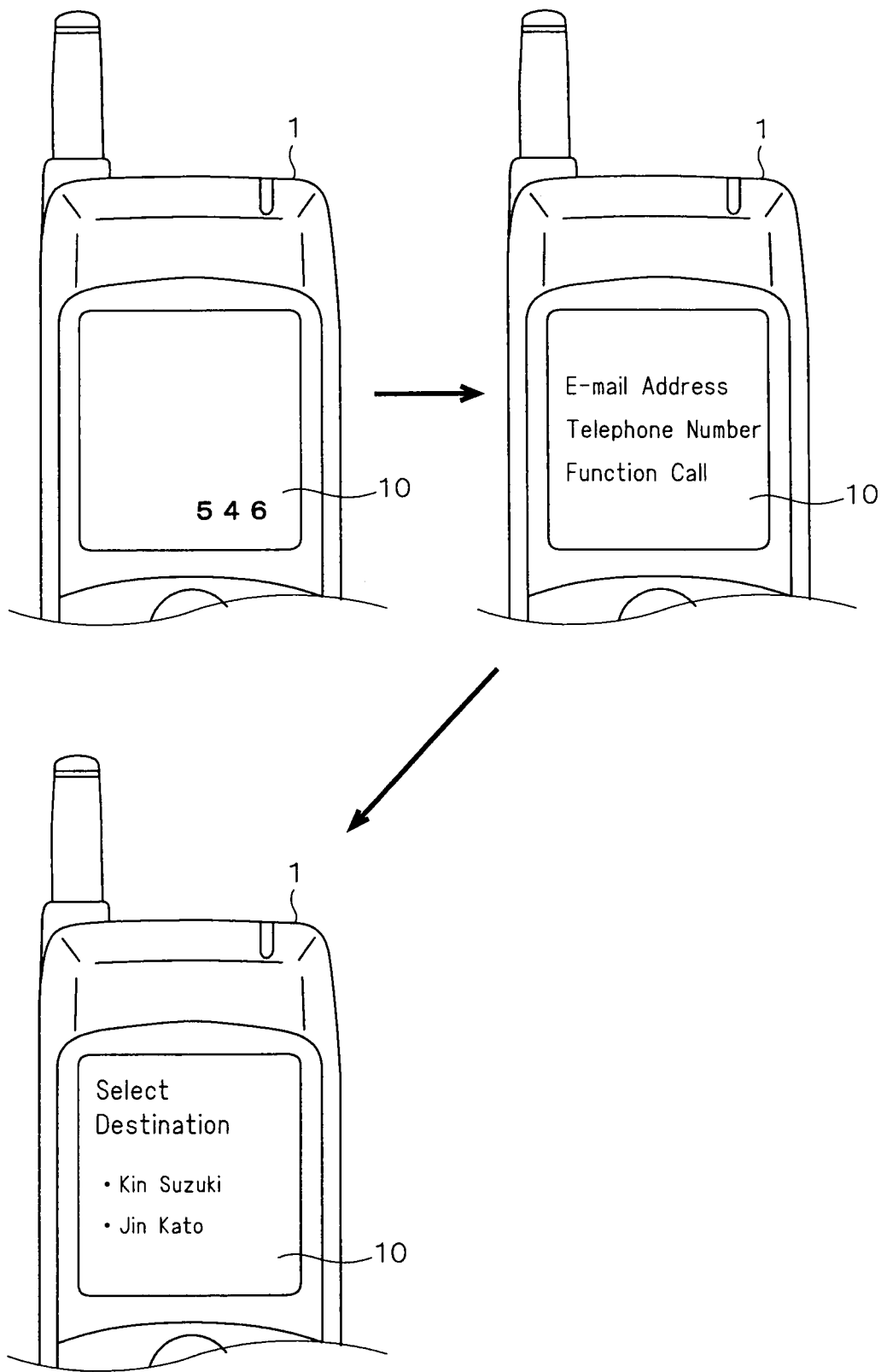
FIG. 9 is a view showing display transitions on the display of the cellular telephone when displaying a registration information type menu.

Additionally, in the above-mentioned preferred embodiments, the user enters a numeric string obtained by the numerical conversion of a keyword, and thereafter presses a function key (e.g., the E-mail key 24 and the address book key) depending on the type of the registration information. However, in response to the press of the predetermined function key after the entry of the numeric string by the user, the processing part 30 may display a registration information type menu on the display 10. FIG. 9 is a view showing display transitions on the display 10 of the cellular telephone 1 when displaying the registration information type menu. First, the user enters a numeric string obtained by the numerical conversion of a keyword of a piece of registration information by using the dial keys 20 of the cellular telephone 1, and enters a predetermined key included among the function keys 23. In response to this, the processing part 30 displays the registration information type menu on the display 10. The user selects a desired one of the types of registration information displayed in the menu. Thereafter, a process similar to that performed when the predetermined function key is pressed in the first preferred embodiment is carried out. For example, when "E-mail Address" is selected, a process similar to that performed when the E-mail key 24 is pressed after the numeric string is entered is carried out. In this manner, the display of the types of registration information in the form of a menu for selection eliminates the need to provide the function keys the number of which is equal to the number of types of registration information. This reduces the number of function keys 23 to simplify the construction of the cellular telephone 1.

The above-mentioned preferred embodiments describe the instance in which the registration information in the cellular telephone 1 is called up. The present invention, however, is not limited to such an instance. The present invention as described above is applicable to a personal digital assistant including at least numerical keys.

The invention claimed is:

1. A cellular telephone allowing registration information to be called up and used, comprising:
a storage part for storing a database including a registration information field and a numeric data field previously directly associated with each other in the database, in which numeric data stored in said numeric data field is obtained by numerical conversion of a keyword related to a piece of the registration information stored in said associated registration information field, said numeric data being a numeric sequence generated by converting said keyword to said numeric sequence by one-to-one corresponding each numerical character and alphabetical character in said keyword to a numerical value on a dial key of a keypad of the cellular telephone representing that numerical character and alphabetical character;
an acceptance part for accepting a numeric string entered by using said dial keys as a request for a predetermined piece of registration information;
a display part for displaying a registration information type menu indicating a plurality of types of registration information and prompting a user to select one of the types of registration information; and
an extraction part for searching said numeric data field in said database to extract a piece of registration information associated with said numeric data containing said numeric string based on the user selected one of the types of registration information,
the display part is also for displaying the piece of registration information extracted by said extraction part which corresponds to the user selected one of the types of registration information.

2. A cellular telephone allowing registration information to be called up and used,
there being an assignment relationship established between each numerical value on a numerical key included among dial keys of a keypad of the cellular telephone, and a plurality of single alphabetical characters included on each respective numerical key,
said cellular telephone comprising:
a storage part for storing a database including a registration information field and a numeric data field previously directly associated with each other in the database, in which numeric data stored in said numeric data field and a piece of the registration information stored in said associated registration information field are previously associated with each other, the numeric data being obtained by one-to-one numerical conversion of a keyword related to said piece of registration information in accordance with said assignment relationship;
an acceptance part for accepting a numeric string entered by using said dial keys as a request for a predetermined piece of registration information;
a display part for displaying a registration information type menu indicating a plurality of types of registration information and prompting a user to select one of the types of registration information; and
an extraction part for searching said numeric data field in said database to extract a piece of registration information associated with said numeric data containing said numeric string based on the user selected one of the types of registration information,
the display part is also for displaying the piece of registration information extracted by said extraction part which corresponds to the user selected one of the types of registration information.

3. The cellular telephone according to claim 2, further comprising:
a registration part for registering numeric data and a new piece of registration information in association with each other in said database when accepting the registration of the new piece of registration information, said numeric data being obtained by numerical conversion of a keyword related to the new piece of registration information in accordance with said assignment relationship.

4. The cellular telephone according to claim 2, wherein when said numeric string is entered and a predetermined function key is pressed, said acceptance part displays types of said registration information to accept a selection thereof, thereby accepting said numeric string as a call request for a selected type of registration information.

5. The cellular telephone according to claim 2, wherein said registration information includes an e-mail address.

6. The cellular telephone according to claim 2, wherein said registration information includes a telephone number.

7. The cellular telephone according to claim 2, wherein said registration information includes a telephone number serving as a destination of short message service.

8. The cellular telephone according to claim 2, wherein said registration information includes a function registered in the cellular telephone.

9. The cellular telephone according to claim 2, wherein said registration information includes an address of a favorite site.

10. The cellular telephone according to claim 2, further comprising:
a call request part for requesting said acceptance part to call up said predetermined piece of registration information which specifies said numeric string when said numeric string is entered on a standby screen and a predetermined dial key is pressed.

11. The cellular telephone according to claim 10, wherein when part of said numerical string is entered on said standby screen, said call request part searches said database for a keyword containing a character string obtained by character conversion of said part in accordance with said assignment relationship to extract and display keyword candidates on said standby screen, thereby accepting a selection thereamong, and requests said acceptance part to call up said predetermined piece of registration information corresponding to a selected keyword.

12. A personal digital assistant including numerical keys, said personal digital assistant allowing registration information to be called up and used, there being an assignment relationship established between each numerical value on numerical keys of a keypad of the personal digital assistant, and a plurality of single alphabetical characters included on each respective numerical key, said personal digital assistant comprising:

a storage part for storing a database including a registration information field and a numeric data field previously directly associated with each other in the database, in which numeric data stored in said numeric data field and a piece of the registration information stored in said associated registration information field are previously associated with each other, the numeric data being obtained by one-to-one numerical conversion of a keyword related to said piece of registration information in accordance with said assignment relationship;

an acceptance part for accepting a numeric string entered by using said numerical keys as a request for a predetermined piece of registration information;

a display part for displaying a registration information type menu indicating a plurality of types of registration information and prompting a user to select one of the types of registration information; and an extraction part for searching said numeric data field in said database to extract a piece of registration information associated with said numeric data containing said numeric string based on the user selected one of the types of registration information, the display part is also for displaying the piece of registration information extracted by said extraction part which corresponds to the user selected one of the types of registration information.

* * * * *